UNITED STATES PATENT OFFICE.

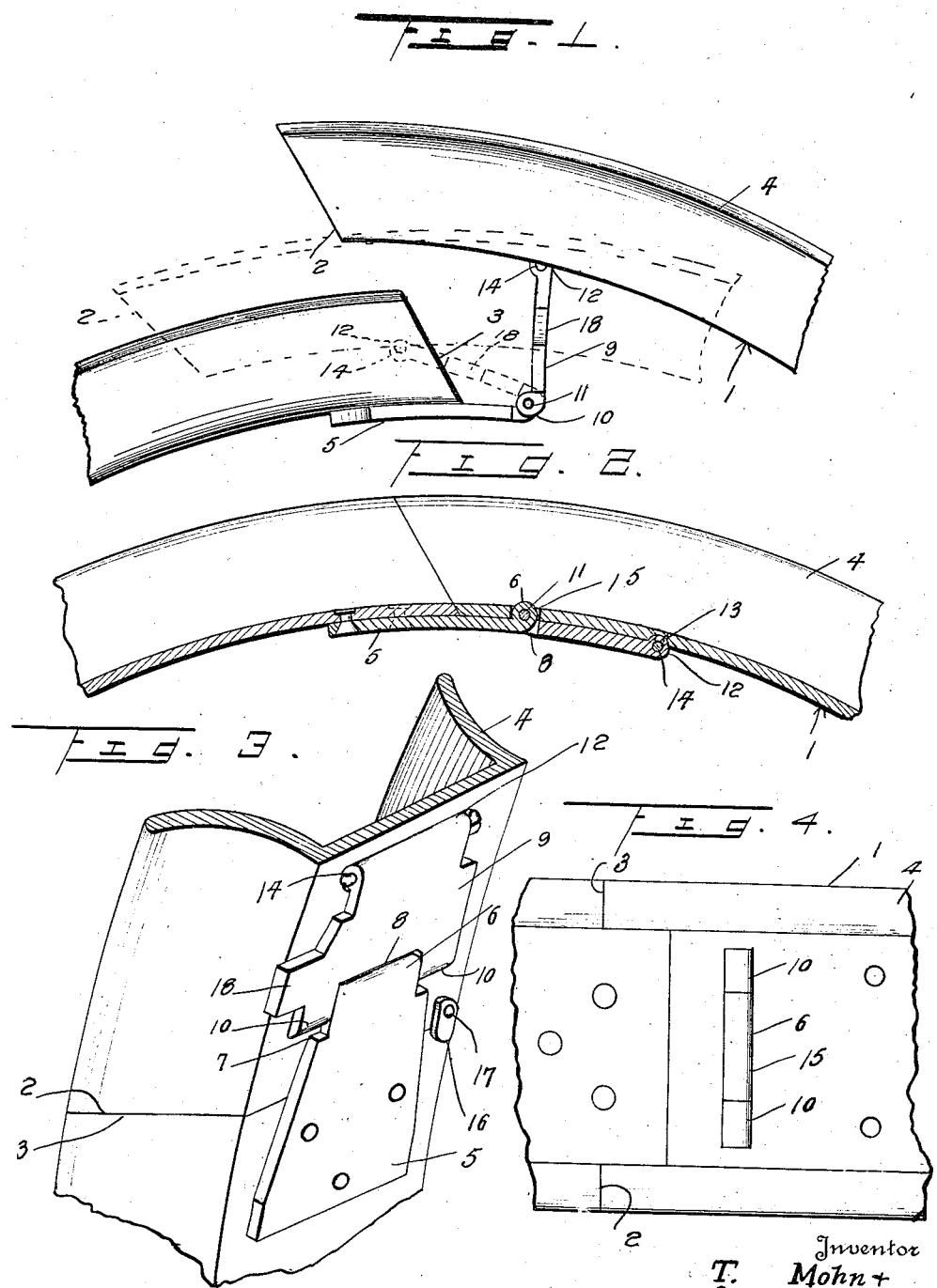

THOMAS MOHN AND ALBERT MOHN, OF RED WING, MINNESOTA.

AUTOMOBILE RIM.

1,415,675.　　　　　　Specification of Letters Patent.　　Patented May 9, 1922.

Application filed November 5, 1920. Serial No. 421,962.

*To all whom it may concern:*

Be it known that we, THOMAS MOHN and ALBERT MOHN, citizens of the United States, residing at Red Wing, in the county of Goodhue and State of Minnesota, have invented certain new and useful Improvements in Automobile Rims; and we do hereby declare the following to be a full, clear, and exact description of the invention, such as will enable others skilled in the art to which it appertains to make and use the same.

This invention relates to new and useful improvements in automobile rims of the split type and has for its primary object the provision of an improved fastener for securing the ends of the rim together and which is especially adaptable for facilitating the collapsing and expanding of the rim, whereby a tire may be easily and quickly removed and placed on the rim, and, when mounted on the rim, the latter's ends may be firmly locked against disarrangement or one end from having undue relative movement with relation to the other end.

Another object of this invention is the provision of a locking element that has connection with the rim adjacent one end and with a tongue secured to the other end, so that the latter end may be moved inwardly and beyond the other end when said locking element is moved in relation to the rim, thereby decreasing the diameter of said rim so that a tire may be readily removed and placed thereon.

A further object of this invention is the provision of a hinge connection between the locking element and the tongue which will permit free movement of the former with relation to the latter and when said locking element is in a rim fastening position, the hinge connection will aid in holding the ends of the rim together by seating in a slot of the rim.

A still further object of this invention is the provision of an automobile rim of the above-stated character which will be simple, durable and efficient and which may be manufactured and sold at a comparatively low cost.

With these and other objects in view, as will become more apparent as the description proceeds, the invention consists in certain novel features of construction, combination and arrangement of parts as will be hereinafter more fully described and claimed.

For a complete understanding of our invention, reference is to be had to the following description and accompanying drawing, in which:

Figure 1 is a fragmental view of the meeting ends of the rim showing it in a partly collapsed position in full lines and in a fully collapsed position in dotted lines.

Figure 2 is a fragmentary longitudinal sectional view illustrating the ends of the rim in fastened position.

Figure 3 is a fragmentary perspective view illustrating the tongue and the locking element.

Figure 4 is a fragmentary plan view illustrating the hinge connection fitting within the groove of the rim.

Referring in detail to the drawing, the numeral 1 indicates a rim of the split type having ends 2 and 3 which are cut on an inclined plane so as to permit the end 3 to move inwardly and beyond the end 2 but which will prevent the end 2 from moving inwardly and beyond the end 3. The rim 1 is provided with the usual tire engaging flanges 4.

A tongue 5 is riveted or otherwise secured to the end 3 and projects beyond said end and has a pintle bearing or barrel 6 formed on the free end thereof. The free end of the tongue 5 is cut away as illustrated at 7 to form an extension on which the pintle bearing or barrel 6 is formed and said extension is adapted to fit within a recess 8 of a locking element or plate 9. The locking element or plate 9, upon each side of the recess 8, is provided with a pintle bearing or barrel 10 adapted to receive a pivot rod or pintle 11 after passing through the barrel 6, thereby firmly hinging the locking element or plate 9 to the free end of the tongue 5. A pintle bearing or barrel 12 is formed on the other end of the locking plate or element 9 and has seating engagement with a groove 13 formed in the rim 1 adjacent to the end 2. A pintle 14 extends through the pintle bearing or barrel 12 and has connection with the rim so that the locking plate or element 9 may have free swinging movement in relation to the rim. It is to be noted that the pintle bearing or barrel 12 seats within the groove 13 so as to relieve the strain upon the pintle 14.

The rim 1 adjacent to the end 2 is provided with a slot 15 adapted to receive the pintle bearings or barrels 6 and 10 when the locking element is in a locking position so as to aid in retaining the ends 2 and 3 in alinement with each other.

A catch 16 is pivoted to the end 2 of the rim 1 as illustrated at 17 and is adapted to underlie the end 3 so as to prevent said end 3 from moving inwardly and beyond the end 2.

The locking plate or element 9 has formed upon one side edge a finger grip 18 which projects slightly beyond the base of the rim so that said locking plate or element 9 may be swung away from the rim to move the end 3 inwardly and beyond the end 2 thereby decreasing the diameter of the rim. By referring to Figure 1 it will be clearly seen just how the locking plate or element 9 draws the end 3 of the rim inwardly and beyond the end 2. It is necessary that the catch 16 be swung on its pivot to disengage the end 3 before said end 3 can be moved inwardly and beyond the end 2 by the locking plate or element 9.

With a tire placed upon the rim and the latter in the position as shown in dotted lines in Figure 1 it is only necessary to press the locking plate or element 9 in the direction of the rim and the end 3 will be moved into alinement with the end 2, thereby expanding the rim to its initial position.

While we have shown and described the preferred embodiment of our invention, it will be understood that minor changes in construction, combination and arrangement of parts may be made without departing from the spirit and scope of the invention as claimed.

Having thus described our invention what we claim is:

1. A tire rim comprising a rim body having separable ends, a tongue secured to the rim body at one of said ends, a locking plate hinged to the rim body adjacent the other end and to the tongue, and an extension formed on one side edge of the plate and of a thickness corresponding to the thickness of said plate to permit the latter to rest evenly on the felly of a wheel and adapted to be engaged by a tool to swing the locking plate for expanding and contracting the rim body.

2. A tire rim comprising a rim body having separable ends and a groove spaced from one of said ends, a tongue secured to the rim body, and an actuating plate for expanding and contracting the rim body and having hinge connections with the tongue and rim body and having one end enlarged and seated in the groove and adapted to ride against the wall of said groove during the movement of the actuating plate to expand or contract the rim body for relieving the strain on the hinge connection between the rim body and said plate.

In testimony whereof we affix our signatures in presence of two witnesses.

THOMAS MOHN.
ALBERT MOHN.

Witnesses:
C. V. DIEPENBROCK,
PLATO E. SARGENT.